United States Patent [19]

Takeuchi et al.

[11] 4,248,156
[45] Feb. 3, 1981

[54] AERIAL TRACKWAY TYPE TANSPORTATION SYSTEM WITH IMPROVED SPEED CONTROLLER

[75] Inventors: Yashuhisa Takeuchi, Yokosuka; Yukiyoshi Hatori, Tokyo; Masatsugu Ohwada, Yokosuka, all of Japan

[73] Assignee: Nissan Motor Company, Limited, Yokohama, Japan

[21] Appl. No.: 907,562

[22] Filed: May 19, 1978

[30] Foreign Application Priority Data

Jul. 20, 1977 [JP] Japan .................................. 52/86963

[51] Int. Cl.³ .............................................. B60L 5/08
[52] U.S. Cl. ..................................... 104/300; 191/59.1
[58] Field of Search ................... 104/152, 149, 148 R, 104/93, 89; 105/148–156; 191/50, 58, 59.1, 60.3, 88

[56] References Cited

U.S. PATENT DOCUMENTS

| | | | |
|---|---|---|---|
| 2,063,291 | 12/1936 | Baumgarten et al. | 191/58 |
| 2,700,705 | 1/1955 | Anjeskey et al. | 191/59.1 |
| 3,261,302 | 7/1966 | Forsman | 104/152 |
| 3,303,294 | 2/1967 | Howell, Jr. | 191/59.1 |
| 3,439,132 | 4/1969 | Weber | 191/59.1 |

FOREIGN PATENT DOCUMENTS 2229573  12/1974  France ....................................... 104/152

*Primary Examiner*—John J. Love
*Attorney, Agent, or Firm*—Lowe, King, Price and Becker

[57] ABSTRACT

A power or current collector of an aerial trackway vehicle has an arm which is movable in accordance with the change of displacement of the current carrying cable with respect to a trackway by which the vehicle is suspended. A speed controller which is sensitive to the movement of the arm controls the speed of the vehicle and/or other vehicular functions.

5 Claims, 8 Drawing Figures

AERIAL TRACKWAY TYPE TANSPORTATION SYSTEM WITH IMPROVED SPEED CONTROLLER

FIELD OF THE INVENTION

The present invention relates in general to an aerial trackway type transportation system which includes self-propelled vehicle suspended from the aerial trackway which moves along same by collecting the current from the current carrying cable, and more particularly to a control system of such transportation system for automatically controlling the running or operation mode of the vehicle.

SUMMARY OF THE INVENTION

It is an object of the present invention to provide an improved aerial trackway type transportation system which assures reliable and automatic transportation.

It is another object of the present invention to provide an automatic control system, for such transportation system, by which the vehicle speed is automatically controlled.

It is still another object of the present invention to provide an automatic control system which uses pivotal movements of an arm of a power or current collector of the vehicle as information for speed control of the vehicle.

It is a further object of the invention to provide an automatic control system in which the pivotal movements of the arm of the current collector are produced by running the arm along a current carrying cable the displacement of which with respect to a vehicle trackway is changed.

It is a further object of the invention to provide an automatic control system, for the above-mentioned transportation system, which is simple in construction.

BRIEF DESCRIPTION OF THE DRAWINGS

Other objects and advantages of the present invention will become apparent from the following description when taken in conjunction with the accompanying drawings, in which.

DESCRIPTION OF THE PRIOR ART

Figure 1:
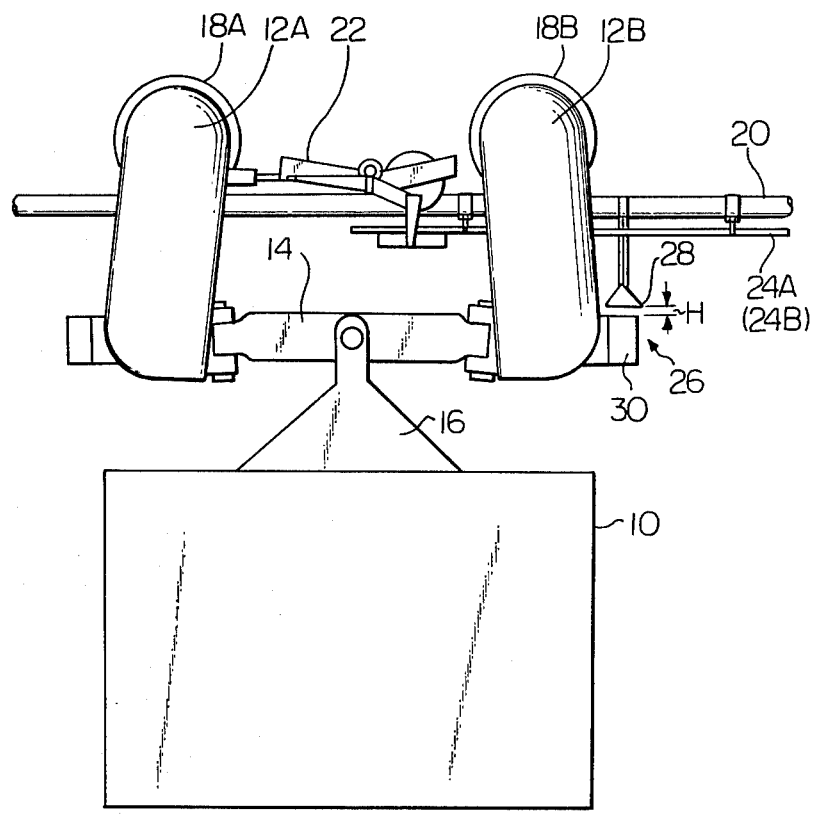
FIG. 1 is a sketch showing a self-propelled vehicle suspended from an aerial trackway and a known speed control system arranged between the vehicle and the trackway.

Prior to describing the construction of the speed control system of the invention, an aerial trackway type transportation system with a known speed control system will be outlined with the aid of FIG. 1 in order to clarify the inventive steps of the subject invention.

In FIG. 1, there is illustrated a self-propelled vehicle suspended from an aerial trackway.

The vehicle comprises a vehicle body 10, front and rear traction units 12A and 12B which are connected to the body 10 through a beam 14 and a bracket 16. Each of the traction units 12A and 12B is provided with a rotatable suspending wheel 18A or 18B driven by an electric motor (not shown) mounted therein or therewith. The suspending wheels 18A and 18B are rollably disposed on an aerial trackway 20 thereby to suspend the vehicle body 10 from the trackway 20. Numeral 22 designates a power or current collector which is pivotally connected to the front traction unit 12A to move on and along the trackway 20 therewith. The current collector 22 is provided with two shoe units (no numerals) slidably contacting respective current carrying cables 24A and 24B suspended by the trackway 20, for collecting the current from the cables for energization of the electric motors. Although not shown in this drawings, suitable numbers of wires or conductors are provided for connection between the electric motors and the shoe units in a conventional manner.

Designated generally by numeral 26 is a known electromagnetic speed control system which comprises suitable numbers of transmitters (though only one is illustrated) 28 which are suspended from the trackway 20 at spaced intervals and a receiver 30 fixed to the rear traction unit 12B. Upon travelling of the vehicle along the trackway 20, the receiver 30 receives, one after another, the inductive radio signals emitted by the transmitters 28 to control the running speed of the electric motors in the front and rear traction units thereby to vary the travelling speed of the vehicle.

In the electromagnetic speed control system mentioned above, however, it happens that the effective distance (H) between the associated one of the transmitters 28 and the receiver 30 varies considerably when the vehicle is subjected to rolling or pitching. Thus, precise speed control of the vehicle is not achieved because the receiver 30 fails to receive a signal having a constant magnitude from the associated transmitters.

DESCRIPTION OF THE EMBODIMENT

Therefore, the present invention contemplates to eliminate the above-mentioned drawback.

As will be clear from the following, the speed control system of the invention is constructed to be combined with a power or current collector of a type shown in FIG. 1.

Figure 2:
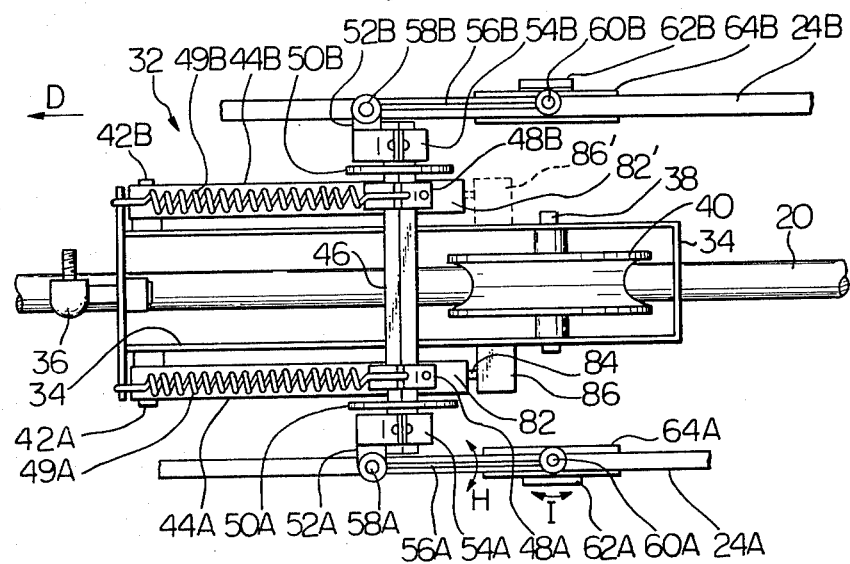
FIGS. 2 and 3 are respective plan and side views of a speed control system according to the present invention.
Figure 3:
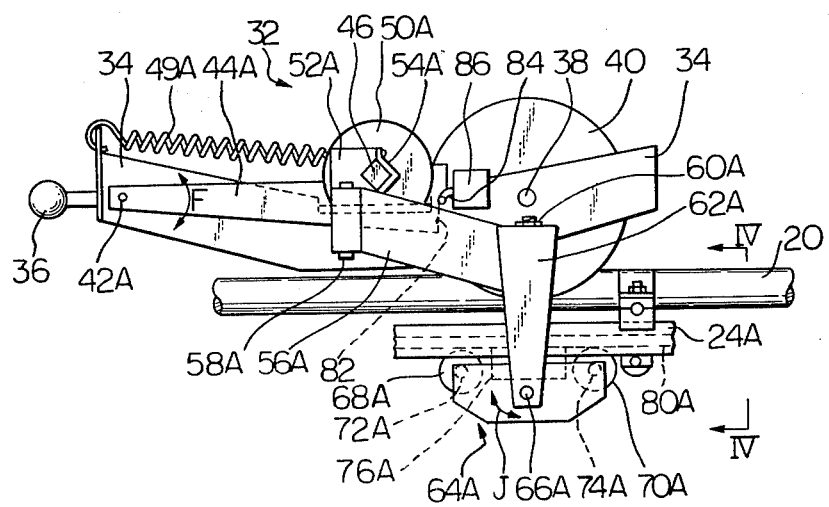
Figure 4:
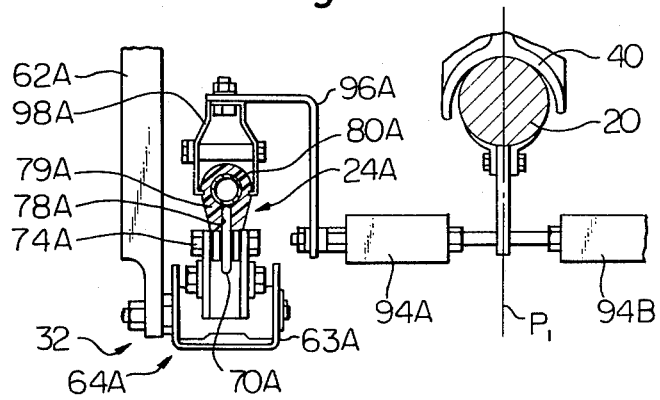
FIG. 4 is a view taken from the line IV—IV of FIG. 3.

Referring to FIGS. 2 to 4, there is illustrated a current collector 32 as cooperated with an aerial trackway 20 having two current carrying cables 24A and 24B.

The current collector 32 comprises a rectangular frame 34 which is connected through a ball joint member 36 to a front traction unit 12A in a manner as shown in FIG. 1. A shaft 38 is transversely disposed in and supported by the frame 34 for mounting thereon a guide wheel 40, the guide wheel 40 being disposed on the trackway 20. On front-side portions of the frame 34 are fixed respectively studs 42A and 42B to which respective first arm members 44A and 44B are pivotally connected at their front portions so that each arm member 44A or 44B is swingable about the stud 42A and 42B in directions as shown by an arrow F of FIG. 3. An insulating rod 46 is spanned between the rear portions of the first arm members 44A and 44B to fixedly interconnect the arm members and provide integral movement thereof. Designated by numerals 48A and 48B are clamps for fixing the insulating rod 46 to the arm members 44A and 44B.

For facilitation of the description, the following explanation of the power collector 32 will be made only with respect to parts located in a left section of the collector 32 with respect to the forward direction (shown by an arrow D in FIG. 2) of the collector 32. The parts located in the right section are substantially the same in construction and configuration as those in the left section. Thus, for ease of understanding and description, parts located in the left section will be indicated by the addition of the letter "A" after each numeral while those in the left section will be indicated by the addition of the letter "B" after each corresponding numeral.

A spring 49A is spanned or connected between a front portion of the frame 34 and the clamp 48A so as to bias the first arm member (44A and thus the member 44B) to swing upwardly. Tightly disposed on a left portion of the insulating rod 46 is an insulating circular plate 50A. On the left end portion of the rod 46 is fixed a bracket 52A via a clamp 54A. A second arm member 56A is connected at its front end to the bracket 52A via a pivot pin 58A so as to be swingable in directions shown by an arrow H in FIG. 2. The rear end of the second arm member 56A is fixed via a pivot pin 60A with a downwardly extending third arm member 62A so that the third arm member 62A is swingable about the pivot pin 60A in directions as viewed by an arrow I of FIG. 2.

A shoe unit 64A is connected via a shaft 66A to a lower end portion of the third arm member 62A so as to be swingable in directions of an arrow J shown in FIG. 3. As is seen from FIG. 4, the shoe unit 64A comprises a housing 63A having a generally U-shaped cross section, front and rear guiding wheels 68A and 70A (see FIG. 3) rotatably disposed in the housing 63A via suitable supporting devices (no numerals) with shafts 72A and 74A (see FIG. 3), and a current collecting shoe 76A located between the guiding wheels 68A and 70A. As will be apparent herein next, the front and rear guiding wheels 68A and 70A and the shoe 76A are partially received in a longitudinally extending groove (78A) formed in the current carrying cable 24A so that the shoe unit 64A is guided by the cable 24A while collecting the current from the same.

In FIG. 4, a detailed construction of the current carrying cable 24A is illustrated as cooperating with the shoe unit 64A. The current carrying cable 24A includes an insulating cover 79A which holds therein a current supply tubular wire 80A to which the current collecting shoe 76A is slidably contacted. The above-mentioned groove 78A is formed by the cover 79A. Although not shown in the drawings, a lead wire is employed to connect the current collecting shoe 76A to a later-described speed control system from which other lead wires extend to the electric motors mounted in the front and rear traction units 12A and 12B. The provision of the springs 49A and 49B causes the shoe 76A of the shoe unit 64A to be pressed against the tubular wire 80A in the cover 79A. The shoe unit 64A is multidirectionally movable with respect to the frame 34 due to usage of several pivotal elements such as 44A, 56A, 62A and 64A. With these, a reliable electrical connection between the shoe 76A and the tubular wire 80A is constantly provided even under the condition wherein the vehicle 10 sways, rolls or dips while travering the trackway.

Figure 7A:
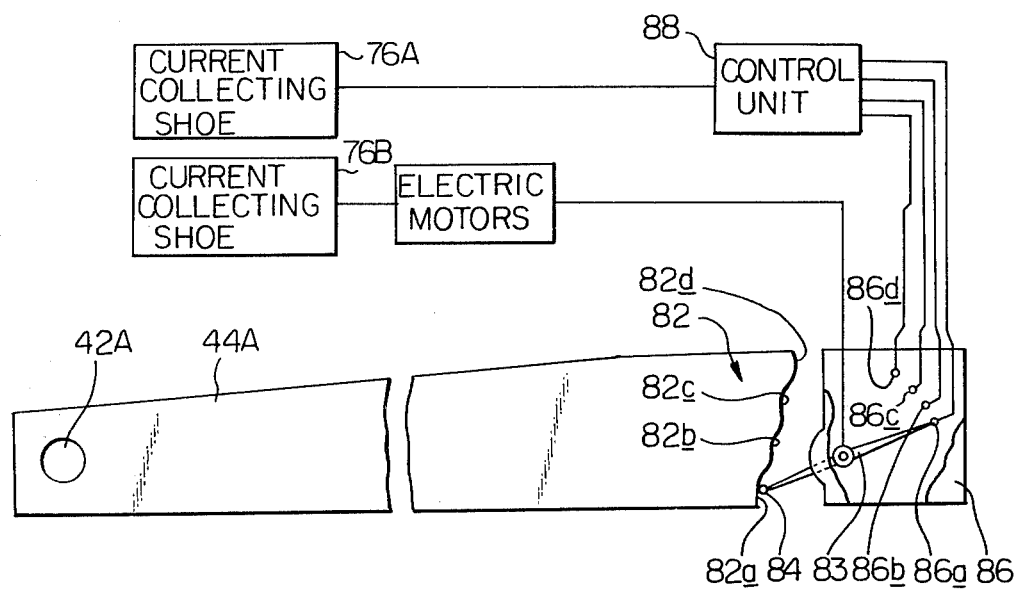
FIGS. 7A and 7B are views of main parts of the speed control system for explaining the operations of the same.
Figure 7B:
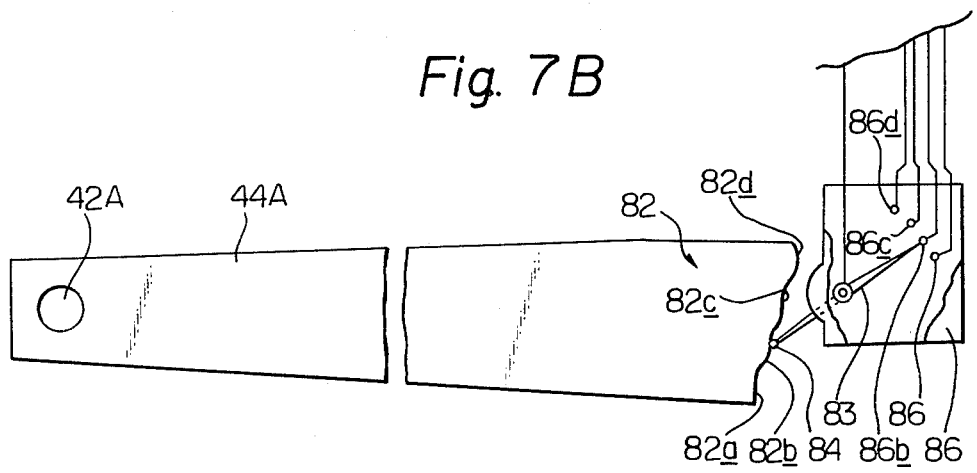

A speed control system of the subject invention is combined with the above-mentioned current collector 32. The speed control system in part comprises a cam portion 82 formed on the right end of the first arm member 44A (see FIG. 3), a rotary switch 86 fixed to the frame 34 and having a swingable contact arm 83 with a cam follower 84 slidably movable on and along the cam portion 82, and a control unit 88. As shown in FIGS. 7A and 7B, the cam portion 82 has first, second, third and fourth cam surfaces 82a, 82b, and 82c and 82d and the rotary switch 86 has first, second, third and fourth stationary contact points 86a, 86b, 86c and 86d. Each of the contact points is connected via a lead wire to the control unit 88 which in turn is connected to the current collecting shoe 76A, while the swingable contact arm 83 which is electrically conductive is connected via a wire to the electric motors in the traction units 12A and 12B which motors in turn are connected to the another shoe 76B. The shoe 76B slides on and along the other current carrying cable 24B. The control unit 88 has therein, for example, a variable resistor for controlling resistance between the electric motors and the current collecting shoe 76A upon contact of the arm 83 with selected one of the contact points 86a to 86d. Thus, the running speed of each motor can be varied by rotation of the arm 83. In the embodiment shown here, the arm 83 contacts the stationary contact points 86a to 86d in order when the follower 84 is engaged with the cam surfaces 82a to 82d, respectively, in response to the rotation of the first arm member 44A about the stud 42A.

Figure 5:
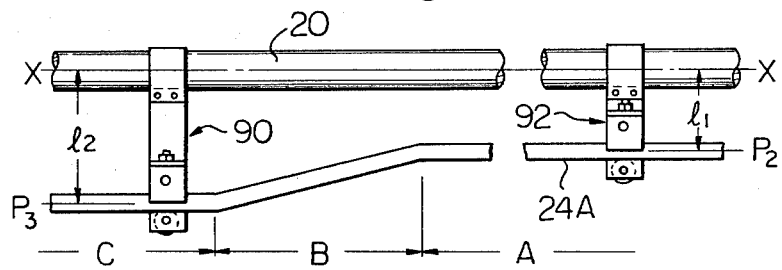
FIGS. 5 and 6 are respective side and plan views of an aerial trackway equipped with two current carrying cables, the trackway and the cables constituting part of the speed control system of the invention.
Figure 6:
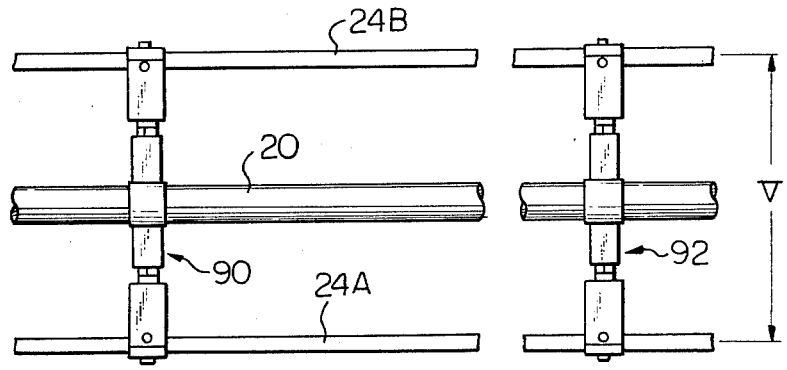

The speed control system of the subject invention further includes the following arrangement which will be described in connection with FIGS. 5 and 6. In FIGS. 5 and 6, there is shown a unit of the current carrying cables 24A and 24B and the trackway 20. As well shown in FIG. 6, the current carrying cables 24A and 24B are suspended by the trackway 20 by means of suspenders 90 and 92. As is best seen in FIG. 4, each of the suspenders 90 and 92 is constructed to be symmetrical with respect a vertical plane $P_1$ diametrically passing through the trackway 20. The left hand section of each suspender 90 or 92 comprises an insulator 94A, a L-shaped bracket 96A and a U-shaped hanger 98A as shown. As best seen from FIG. 5, each of the current carrying cables 24A and 24B is so arranged as to have a plurality of sections parallel with each other and the trackway 20 (such as the sections A and C) the vertical distances from which to the trackway 20 being different, and several inclined sections (such as the section B) each being located between the adjacent two parallel sections. A more detailed explanation of the will be made by the aid of FIG. 5. In this drawing, the reference $P_2$ denotes an imaginary plane which contains therein the center lines of the cables 24A and 24B located in the A section, while the reference $P_3$ denotes an imaginary plane containing the center lines of the cables located in the C section. The reference $l_1$ denotes the distance between the plane $P_2$ and the center line X of the trackway 20, while, the reference $l_2$ denotes the distance between the plane $P_3$ and the center line X. The distance $l_1$ is smaller than that of $l_2$. Now, it should be noted that in the embodiment herein disclosed, four parallel sections are preferably provided in the cables 24A and 24B since the hereinbefore-mentioned rotary switch 86 and the cam portion 82 are constructed to sense four positions. Experiments have revealed that the value of $l_2 - l_1$ should be at least 40 mm to assure optimal function of the control system under the condition wherein the vehicle weight is about 1 ton and the travelling speed of the vehicle ranges from about 1 m/sec to about 2 m/sec.

With the above-described construction, the speed control system of the invention operates as follows. (For facilitation, the explanation will be made with respect to FIGS. 5, 7A and 7B).

While the vehicle 10 runs along the trackway 20 corresponding to the section A, the first arm member 44A is kept in a position wherein the cam surface 82a of the cam portion 82 engages with the cam follower 84 of the swingable arm 83 providing an electric connection between the arm 83 and the first stationary contact point 86a as viewed in FIG. 7A. Under this condition, the electric motors in the front and rear traction units 12A and 12B run at a first predetermined speed moving the vehicle 10 at a first corresponding speed along the trackway 20.

When the vehicle 10 reaches section C after passing through section B, the first arm member 44A swings downwardly to assume a position wherein the second cam surface 82b engages with the cam follower 84 thus now providing contact between the arm 83 and the second stationary contact point 86b as viewed in FIG. 7B. With this, the electric motors run at a second predetermined speed moving the vehicle at a corresponding second speed. Now, since the vehicle has a considerable inertia, it will not stop or stall during the time the current collecting shoes 64A and 64B engages the inclined sections, such as "B", wherein the movable contact arm is between stationary contacts inducing deenergization of the electric motors. In practice, tests show that it is best that the length of the cables in the section B is about 20 to 30 cm.

It will be appreciated that similar operation to the above occurs to further change the speed of the vehicle 10 when the first arm member 44A rotates to provide contact between the arm 83 and the contact point 86c or 86d.

If desired, the arm position sensing unit that consists of the cam portion and the rotary switch may be arranged in the right hand section of the current collector 32 as is illustrated in dotted lines 82' and 86' in FIG. 2.

Although in the previous description, the arrangement of the current carrying cables 24A and 24B to the trackway 20 has been explained in connection with the variation of the vertical distance between the cables and the trackway for achieving pivotal movements of the first arm member 44A, it is also possible to vary the lateral distance V (see FIG. 6) between the current carrying cables 24A and 24B for obtaining the pivotal movements of the second arm member 56A or 56B. In this case, the left end of the second arm member is formed with a cam portion having a shape similar to the above mentioned cam portion 82, and a rotary switch similar to the switch 86 is located adjacent to the cam portion in substantially the same manner as mentioned before.

Although the foregoing description shows only the speed control system of the aerial trackway type transportation system, various modifications such as a vehicle position indicating system by which the position of the vehicle is automatically indicated and an automatic door opening system by which the doors of the vehicle automatically open and close at stations are apparent to those skilled in the art without departing from the scope of the subject invention.

What is claimed is:
1. A transportation system comprising, in combination:
an aerial trackway having first and second current carrying cables longitudinally extending along opposite sides of said trackway, said cables being arranged such that the distance between said first and second cables is substantially constant and said cables are substantially symmetric with respect to a vertical imaginary plane including the axis of said trackway, each of said cables being bent in vertical directions to have at least first and second sections which are parallel with said trackway, the distance between the axis of said trackway and an imaginary plane which includes the axes of said first sections of said first and second cables being different from that between the axis of said trackway and another imaginary plane which includes the axes of said second sections of said first and second cables;
a vehicle having a traction unit with a supporting wheel driven by an electric motor, said supporting wheel being disposed on said trackway to enable said vehicle to run along said trackway;
a current collector device, said collector device including a frame pivotally connected to said traction unit, a guide wheel rotatably mounted on said frame and disposed on said trackway to permit said current collector device to run with said vehicle along said trackway, first and second arms pivotally connected to said frame and respectively equipped at their free ends with current collecting shoes which are in slidable contact with said first and second current carrying cables, respectively, each of said arms being movable in accordance with a change of displacement of a corresponding cable with respect to said trackway upon movement of said means for providing synchronous swingable movements of said first and second arms about a common axis parallel to the rotation axis of said guide wheel; and
cable displacement sensing means for sensing the change of displacement of one of said cables with respect to said trackway to govern the power delivered to an apparatus of said vehicle to control the operation mode of said vehicle;
said current collecting device providing the synchronous movements with a structure comprising a rod bridging third and fourth arms, said third and fourth arms pivotally connected to said first and second arms, respectively, a second end of each of said third and fourth arms being pivotally connected to said frame.

2. A transportation system as claimed in claim 1, in which said cable displacement sensing means comprises:
an arm member having one end swingably connected to said frame and the other end pivotally connected to one of said first and second arms so that said arm member is swingable about said common axis in accordance with the change of displacement of each of said cables with respect to said trackway;
a position sensing means for sensing the angular position of said arm member; and
a control unit for controlling the power delivered to said apparatus in accordance with the position information issued from said position sensing means.

3. A transportation system as claimed in claim 2, in which said apparatus is said electric motor whereby the running speed of said electric motor and thus the cruising speed of said vehicle are controlled in accordance with the change of displacement of said cable with respect to said trackway as said vehicle travels along said trackway.

4. A transportation system as claimed in claim 2, in which said position sensing means comprises:
 a cam portion formed on said arm member, said cam portion having at least two cam surfaces; and
 a rotary switch member fixed to said frame having at least two stationary contact points and a swingable arm which is swingable about a pivot to permit an end thereof to selectively contact said stationary contact points,
 said rotary switch member arranged such that the other end of said swingable arm is in slidable contact with said cam surfaces on said arm member whereby the swinging movement of said arm member about said common axis produces a corresponding swinging motion of said swingable arm about said pivot.

5. A transportation system as claimed in claim 1, in which said current collector device further includes biasing means for forcing said current collecting shoes into contact with said first and second current carrying cables.

* * * * *